United States Patent
Lin et al.

(10) Patent No.: US 9,769,400 B2
(45) Date of Patent: Sep. 19, 2017

(54) PULSE DETECTION BANDPASS FILTER WITH GAIN STAGE

(71) Applicant: Sensors Unlimited, Inc., Princeton, NJ (US)

(72) Inventors: Minlong Lin, Plainsboro, NJ (US); Joshua Lund, Dallas, TX (US)

(73) Assignee: Sensors Unlimited, Inc., Princeton, NJ (US)

(*) Notice: Subject to any disclaimer, the term of this patent is extended or adjusted under 35 U.S.C. 154(b) by 21 days.

(21) Appl. No.: 14/997,184

(22) Filed: Jan. 15, 2016

(65) Prior Publication Data

US 2017/0208266 A1    Jul. 20, 2017

(51) Int. Cl.
*H04N 5/357* (2011.01)
*H04N 5/378* (2011.01)

(52) U.S. Cl.
CPC ............. *H04N 5/357* (2013.01); *H04N 5/378* (2013.01)

(58) Field of Classification Search
CPC .... G01S 17/023; G01S 7/4804; G01S 7/4863; H01L 27/14609; H01L 27/14643; H04N 5/3745; H04N 5/3765
See application file for complete search history.

(56) References Cited

U.S. PATENT DOCUMENTS

| | | | |
|---|---|---|---|
| 6,864,965 B2 | 3/2005 | DeFlumere | |
| 8,471,705 B2 | 6/2013 | Yenisch et al. | |
| 8,581,168 B2 | 11/2013 | Linder et al. | |
| 2012/0305786 A1* | 12/2012 | Dierickx | G01J 1/44 250/371 |
| 2014/0339399 A1* | 11/2014 | Sanson | H04N 5/33 250/214 A |

* cited by examiner

*Primary Examiner* — Kelly L Jerabek
(74) *Attorney, Agent, or Firm* — Locke Lord LLP; Scott D. Wofsy; Judy R. Naamat

(57) ABSTRACT

An imaging pixel is provided. The imaging pixel includes a photodetector that outputs charge signals in response to incident light and laser pulses and a high-frequency path. A detector biasing circuit is further provided that biases high-frequency signals of the charge signals that are associated with the laser pulses to follow the high frequency path. The detector biasing circuit effectively filters low-frequency signal components of the charge signals from following the high-frequency path.

18 Claims, 2 Drawing Sheets

PULSE DETECTION BANDPASS FILTER WITH GAIN STAGE

BACKGROUND OF THE DISCLOSURE

1. Field of the Invention

The present disclosure relates to pulse detection, and more particularly to pulse detection using a bandpass filter with a gain stage.

2. Description of Related Art

Multiband image sensors can be used for concurrent capture and readout of images with signal content over a variety of temporal frequencies. However, conventional imaging pixels are limited in their ability to distinguish signals based on their temporal frequencies. For example, an image may include a short duration signal, such as a laser pulse, and a constant signal, such as reflected sunlight. A conventional pixel is limited in its ability to distinguish and accurately sense these signals that have very different temporal frequency content.

In a military application, laser coded pulses can be applied to an object being imaged to identify the object in the image. The objective is to generate a single image that shows the object identified based on the laser coded pulses. There is a large difference between the signal frequency associated with the laser pulses and the signal frequency associated with the imaged object. It is often the case that absolute signal strength of a laser pulse signal in photons is much less than a background signal strength of the imaged object. In conventional imagers, a single pixel is unable to capture an image of the laser with adequate sensitivity because it cannot distinguish the laser pulse signal energy from the image background signal energy.

While conventional methods and systems have generally been considered satisfactory for their intended purpose, there is still a need in the art for pixels to have increased bandwidth for multiband sensing to enable sensing signals with high temporal frequency content, such as signals associated with laser pulses, with high sensitivity while simultaneously imaging a background scene with low temporal frequency content. There is a need for a single pixel to be able to capture an image of a laser output and an object being targeted by the laser. The present disclosure provides a solution for this problem.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, the subject disclosure is directed to an imaging pixel. The imaging pixel includes a photodetector that outputs charge signals in response to incident light and laser pulses and a high-frequency path. A detector biasing circuit is further provided that biases high-frequency signals of the charge signals that are associated with the laser pulses to follow the high frequency path. The detector biasing circuit effectively filters low-frequency signals of the charge signals from following the high-frequency path.

In embodiments, the detector biasing circuit can include a transistor. The detector biasing circuit can change impedance in response to frequency of a signal received by the detector biasing circuit. Further, the high frequency path can be independent of the detector biasing circuit.

In addition, in embodiments, the imaging pixel can further include an adaptive low-pass filter coupled to the high-frequency path that receives the high-frequency signals. The adaptive low-pass filter can remove signal components above a frequency threshold from the high-frequency signals, and output a low-frequency signal component of the high-frequency signals. The adaptive low-pass filter can be configured with a bandwidth selected to correspond to an edge rate of the laser pulses. The low-frequency component output by the adaptive low-pass filter can preserve charge information in the laser pulses.

In addition, in embodiments, the imaging pixel can further include an adaptive high-pass filter that can receive the low-frequency signal component and remove spurious low-frequency components from the received high-frequency signal component. The removed spurious low-frequency component can correspond to slowly varying background variations in the low-frequency signal component.

Additionally, in embodiments, the imaging pixel can further include a gain stage that can receive and amplify output from the adaptive high-pass filter and output a signal having a shape that is conducive for digital readout.

In accordance with an aspect of the disclosure, an imaging device is provided that includes a focal plane array that includes the imaging pixel array.

In accordance with an aspect of the disclosure, a method is provided for bandpass processing multiband signals output in an imaging pixel to obtain useful pulse information. The method includes receiving charge signals that correspond to sensed incident light and laser pulses, biasing high-frequency signals of the charge signals that are associated with the laser pulses to follow a high frequency path, and effectively filtering low-frequency signals of the charge signals from following the high-frequency path.

In embodiments the method can include removing signal components above a frequency threshold from the high-frequency signals and outputting a low-frequency signal component of the high-frequency signals. The method can further include removing spurious low-frequency components from the high-frequency signal component.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
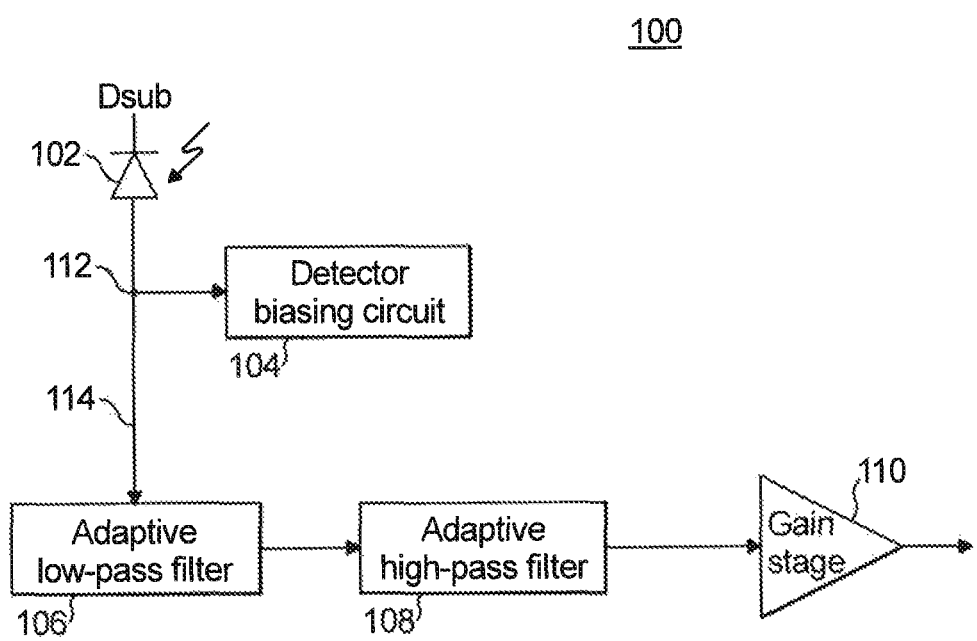
FIG. 1 shows a schematic diagram of an exemplary embodiment of an imaging pixel providing bandwidth processing for processing captured laser pulses in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of an enhanced pixel for multiband processing in accordance with the disclosure is shown in FIG. 1 and is designated generally by reference character 100. Other embodiments of an enhanced pixel in accordance with the disclosure, or aspects thereof, are provided in FIG. 2, as will be described.

An example enhanced pixel 100 for multiband processing is shown in FIG. 1. The enhanced pixel 100 includes a photodetector 102 that transmits charge signals in response to a detected excitation signal, such as photons from a source of IR radiation light or a laser. The photodetector 102 converts the excitation signal into electrical charge signals. The charge signals can include a high-frequency (HF) laser pulse signals and a low-frequency (LF) image signals. The enhanced pixel 100 further includes one or more circuit components, which can include a detector biasing circuit 104, an adaptive low-pass filter 106, an adaptive high-pass filter 108, and a gain stage 110. The circuit components 104, 106, 108, and 110 can be individual electronic devices, or one or more of circuit components 104, 106, 108, and 110 can share one or more electronic devices.

The detector biasing circuit 104 and the photodetector 102 are both coupled to node 112 of the enhanced pixel 100. The detector biasing circuit 104 responds to the charge signals output by the photodetector 102 based on a frequency of the charge signals. While maintaining a DC voltage across the photodetector 102, the detector biasing circuit 104 responds to high frequency charge components output by the photodetector 102 by causing high-frequency currents associated with the charge signals to integrate on the photodetector 102. Due to a high input impedance of both the detector biasing circuit 104 and adaptive low-pass filter 106, high-frequency incident charge signals have instantaneous charge integration at node 112 associated with capacitance of photodetector 102 and parasitic capacitances at node 112.

The detector biasing circuit 104 can include one or more electrical devices that change impedance in response to frequency of the charge signals. An example of such electrical devices that change impedance in response to the frequency of a received signal include a transistor with a fixed DC bias applied to its gate. Another example electrical device is a transistor having a gate controlled by the output of an operational amplifier that includes one or more transistors. The transistor can sample voltage at 112 and form a negative feedback loop. Depending on the bias preference of the photodetector 102, the transistor can be an NMOS transistor or a PMOS transistor. Impedance across the detector biasing circuit 104 can increase when frequency associated with the charge signal is high, allowing charge signals having a low frequency to flow through the detector biasing circuit 104 to a low-frequency path (not shown), and charge signals having a high frequency to accumulate at an input to the detector biasing circuit 104 and follow a high-frequency path 114. Effectively, the charge signals having a low frequency are filtered from flowing along the high-frequency path 114.

By responding to the frequency output by the photodetector 102, the detector biasing circuit 104 can adaptively filter current associated with the charge output by the photodetector 102 in real-time. In particular, by increasing impedance in response to an increase in frequency, the detector biasing circuit 104 biases charge exiting the photodetector 102 to propagate along the high-frequency path 114 as an alternate path to traversing the detector biasing circuit 104.

The high-frequency signals that propagate along the high-frequency path 114 are filtered by the adaptive low-pass filter 106. The adaptive low-pass filter 106 can include, for example, a buffer, amplifier, or an electrical circuit with an equivalent resistor followed by a capacitor. The adaptive high-pass filter 108 is tuned to pass low-frequency components of the signal, wherein a bandwidth of the frequency passed corresponds to an optimized frequency bandwidth that excludes spurious low-frequency noise while preserving high-frequency laser signals.

The impedance of the adaptive low-pass filter 106 intrinsically changes in response to changes in the frequency content of signals that reach the adaptive low-pass filter 106. As frequency increases, the impedance increases, impeding high frequency components of the laser pulse signals from passing through the adaptive low-pass filter 106. In an example embodiment without limitation thereto, bandwidth of the adaptive low-pass filter 106 can be tuned, by varying a bias current applied to an amplifier included in the adaptive low-pass 106. The bandwidth of the adaptive low-pass filter 106 can be optimized to include most of the energy included in the laser pulse signals while preserving high-frequency signals. Thus, by allowing only the tuned bandwidth of the charge signal associated with a laser pulse signal to pass, the adaptive low-pass filter 106 preserves charge information in the laser pulse signals, while minimizing noise. In doing so, the adaptive low-pass filter may remove signal components above a frequency threshold from the high-frequency signals and output a low-frequency signal component of the high-frequency signals.

The detector biasing circuit 104, which controls high-frequency signals to propagate along the high-frequency path 114, effectively performs high-pass filtering. Thus, the detector biasing circuit 104 in combination with the adaptive low-pass filter 106 provides an effective bandpass filter that filters high-frequency pulses from multiband signals and further filters a low-frequency portion of the pulses, preserving associated charge information.

In embodiments, the adaptive high-pass filter 108 is included to provide further bandpass filtering to clean the pulse signal output by the adaptive low-pass filter 106 by removing undesired low-frequency components. The adaptive high-pass filter 108 can include, for example, an electrical circuit in which a capacitor is followed by an equivalent resistor. For example, the adaptive high-pass filter 108 can remove spurious, slowly-varying background noises.

The cleaned signal that emerges from the adaptive high-pass filter 108 includes a low-frequency portion of the desired high-frequency component that was biased by the detector biasing circuit 104 to propagate along the high-frequency path 114, which is divested of spurious, slowly varying DC background noises by the adaptive high-pass filter 108. The gain stage 110 can be a single or multiple stage amplifier that amplifies the signal output by the adaptive high-pass filter 108 to provide a signal having a shape that is conducive to being sampled as an analog voltage and read out by a readout circuit (not shown). In examples without limitation thereto, gain stage 110 can include a common-source amplifier, a common-gate amplifier, a comparator followed by an amplifier, or any device(s) that can amplify signals output by the adaptive high-pass filter 108 to levels that can be sampled or differentiated as signals having voltages distinctively below or above a threshold voltage.

In embodiments, the adaptive low-pass filter 106 can be configured integral with the detector biasing circuit 104. In this embodiment, the architecture remains the same as described, except the adaptive low-pass filter 106 is included inside the detector biasing circuit 104, wherein output from the adaptive low-pass filter 106 is still provided to the adaptive high-pass filter 108. Output from the gain stage 110 can be controlled by a switching circuit (not shown) that can be provided to a signal readout circuit (not shown).

In accordance with an embodiment, an example method is provided for bandpass processing multiband signals output in an imaging pixel to obtain useful pulse information. The method includes receiving charge signals that correspond to sensed incident light and laser pulses, diverting high-frequency signals of the charge signals that are associated with the laser pulses to follow a high frequency path, and effectively filtering low-frequency signals of the charge signals from following the high-frequency path.

In embodiments, the method can include removing high-frequency components from the high-frequency signals and outputting a low-frequency signal component of the high-frequency signals. The method can further include removing spurious low-frequency components from the high-frequency signal component.

Figure 2:
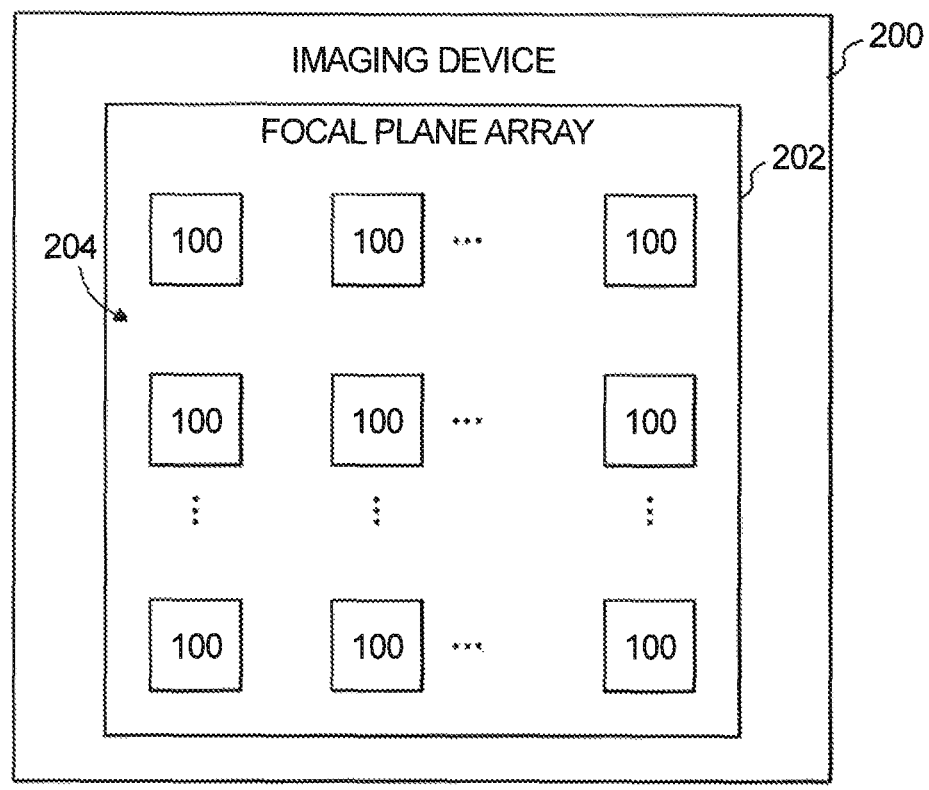
FIG. 2 is a block diagram of an imaging device having an array of the imaging pixels shown in FIG. 1.

With reference now to FIG. 2, an imaging device 200 is illustrated that includes a focal plane array 202 (e.g., a readout integrated circuit (ROIC)) have an array of enhanced pixels 100 arranged on a substrate 204. The imaging device 200 can further include optics, row and column drivers, decoders, signal processing circuits, and image processing circuits (not shown). Further, the imaging device 200 can include one or more processing devices (not shown) that execute stored programmable instructions to control and/or perform functions of the imaging device 200.

The methods and systems of the present disclosure, as described above and shown in the drawings, provide for providing bandpass processing of photodetector charge output to produce a clean signal that corresponds to laser pulses and preserves charge information associated with the laser pulses, and amplification of the clean signal to provide a signal that is suitable for digital processing. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An imaging pixel comprising:
   a photodetector outputting charge signals in response to incident light and laser pulses;
   a high-frequency path;
   a detector biasing circuit to bias high-frequency signals of the charge signals that are associated with the laser pulses to follow the high frequency path and effectively filter low-frequency signals of the charge signals from following the high-frequency path; and
   an adaptive low-pass filter that changes impedance in response to changes in frequency of the high-frequency signals, the adaptive low-pass filter being coupled to the high-frequency path that receives the high-frequency signals, and outputting a low-frequency signal component of the high-frequency signal.

2. The imaging pixel of claim 1, wherein the detector biasing circuit includes a transistor.

3. The imaging pixel of claim 2, the adaptive low-pass filter removing signal components above a frequency threshold from the high-frequency signals.

4. The imaging pixel of claim 3, wherein the adaptive low-pass filter is configured with a bandwidth selected to correspond to an edge rate of the laser pulses.

5. The imaging pixel of claim 4, wherein the low-frequency component output by the adaptive low-pass filter preserves charge information in the laser pulses.

6. The imaging pixel of claim 3, further comprising an adaptive high-pass filter that receives the low-frequency signal component and removes spurious low-frequency components from the received high-frequency signal component.

7. The imaging pixel of claim 6, wherein the removed spurious low-frequency component corresponds to slowly varying background variations in the low-frequency signal component.

8. The imaging pixel of claim 6, further comprising a gain stage that receives and amplifies output from the adaptive high-pass filter and outputs a signal having a shape that is conducive for digital readout.

9. The imaging pixel of claim 1, wherein the high frequency path is independent of the detector biasing circuit.

10. An imaging device having a focal plane array that includes an imaging pixel array, the imaging pixel array comprising:
    a plurality of imaging pixels, the imaging pixels comprising:
    a photodetector outputting charge signals in response to incident light and laser pulses;
    a high-frequency path;
    a detector biasing circuit to bias high-frequency signals of the charge signals that are associated with the laser pulses to follow the high frequency path and effectively filter low-frequency signals of the charge signals from following the high-frequency path; and
    an adaptive low-pass filter that changes impedance in response to changes in frequency of the high-frequency signals, the adaptive low-pass filter being coupled to the high-frequency path that receives the high-frequency signals, and outputting a low-frequency signal component of the high-frequency signal.

11. The imaging device of claim 10, wherein the high frequency path is independent of the detector biasing circuit.

12. The imaging device of claim 10, the adaptive low-pass filter removing signal components above a frequency threshold from the high-frequency signals.

13. The imaging device of claim 12, further comprising an adaptive high-pass filter that receives the low-frequency signal component and removes spurious low-frequency components from the received high-frequency signal component.

14. The imaging device of claim 13, further comprising a gain stage that receives and amplifies output from the adaptive high-pass filter and outputs a signal having a shape that is conducive for digital readout.

15. A method for detecting laser pulses by an imaging pixel, the method comprising:
    receiving charge signals that correspond to sensed incident light and laser pulses;
    biasing high-frequency signals of the charge signals that are associated with the laser pulses to follow a high frequency path, effectively filtering low-frequency signals of the charge signals from following the high-frequency path;
    applying adaptive low-pass filtering to the high-frequency signals following the high frequency path, the low-pass filtering changing impedance in response to changes in frequency of the high-frequency signals; and
    outputting a low-frequency signal component of the high-frequency signal.

16. The method of claim 15 further comprising, removing signal components above a frequency threshold from the high-frequency signals.

17. The method of claim 15 further comprising removing spurious low-frequency components from the high-frequency signal component.

18. The method of claim 15 further comprising:
  amplifying the high-frequency signals after the spurious low-frequency components are removed; and
  outputting the amplified high-frequency signals with a shape that is conducive for digital readout.

\* \* \* \* \*